(12) United States Patent
Zheng et al.

(10) Patent No.: US 11,070,725 B2
(45) Date of Patent: Jul. 20, 2021

(54) IMAGE PROCESSING METHOD, AND UNMANNED AERIAL VEHICLE AND SYSTEM

(71) Applicant: SZ DJI TECHNOLOGY CO., LTD., Shenzhen (CN)

(72) Inventors: Hongyong Zheng, Shenzhen (CN); Zhenbo Lu, Shenzhen (CN); Pan Hu, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/802,041

(22) Filed: Feb. 26, 2020

(65) Prior Publication Data

US 2020/0195847 A1 Jun. 18, 2020

Related U.S. Application Data

(63) Continuation of application No. PCT/CN2017/100072, filed on Aug. 31, 2017.

(51) Int. Cl.
*H04N 5/232* (2006.01)
*G06K 9/62* (2006.01)
*G06K 9/00* (2006.01)

(52) U.S. Cl.
CPC ....... *H04N 5/23238* (2013.01); *G06K 9/0063* (2013.01); *G06K 9/6201* (2013.01); *H04N 5/23229* (2013.01)

(58) Field of Classification Search
None
See application file for complete search history.

(56) References Cited

U.S. PATENT DOCUMENTS

| 9,235,923 | B1 | 1/2016 | Robinson et al. | |
| 2006/0153447 | A1* | 7/2006 | Ouchi | G06K 9/4642 |
| | | | | 382/173 |
| 2012/0167144 | A1* | 6/2012 | Avison-Fell | H04N 1/00331 |
| | | | | 725/51 |

(Continued)

FOREIGN PATENT DOCUMENTS

| CN | 1707353 A | 12/2005 |
| CN | 102812497 A | 12/2012 |

(Continued)

OTHER PUBLICATIONS

The World Intellectual Property Organization (WIPO) International Search Report for PCT/CN2017/100072 dated Jun. 6, 2018 9 pages.

*Primary Examiner* — Frederick D Bailey
(74) *Attorney, Agent, or Firm* — Anova Law Group, PLLC (57) ABSTRACT

Image processing method, drone, and drone-camera system are provided. The method includes acquiring, according to a current environmental parameter of the drone, a target sky image that matches the current environmental parameter; and determining a direction parameter of the camera device when capturing a to-be-stitched image. The to-be-stitched image is an image captured under the current environmental parameter. The method further includes stitching the target sky image with the to-be-stitched image according to the direction parameter to obtain a panoramic image.

18 Claims, 5 Drawing Sheets

(56) References Cited

U.S. PATENT DOCUMENTS

| | | | | |
|---|---|---|---|---|
| 2015/0062291 A1* | 3/2015 | Kim | ....................... | H04N 5/272 |
| | | | | 348/36 |
| 2016/0105649 A1* | 4/2016 | Pettegrew | ................. | G06T 5/50 |
| | | | | 348/37 |
| 2016/0127642 A1 | 5/2016 | Schechner et al. | | |
| 2016/0260195 A1 | 9/2016 | Vegh et al. | | |
| 2017/0124745 A1* | 5/2017 | Christ | .................... | G01C 11/04 |
| 2018/0120847 A1* | 5/2018 | Chen | .................... | G05D 1/0094 |
| 2018/0218533 A1* | 8/2018 | Millin | ..................... | G01C 11/34 |
| 2020/0211215 A1* | 7/2020 | Colosimo | ............... | G01S 11/12 |

FOREIGN PATENT DOCUMENTS

| | | |
|---|---|---|
| CN | 102982515 A | 3/2013 |
| CN | 103141078 A | 6/2013 |
| CN | 105205853 A | 12/2015 |
| CN | 204937526 U | 1/2016 |
| CN | 105550994 A | 5/2016 |
| CN | 105915794 A | 8/2016 |
| CN | 106485655 A | 3/2017 |
| JP | 2016205930 A | 12/2016 |

* cited by examiner

IMAGE PROCESSING METHOD, AND UNMANNED AERIAL VEHICLE AND SYSTEM

CROSS-REFERENCE TO RELATED APPLICATION

This application is a continuation of International Application No. PCT/CN2017/100072, filed Aug. 31, 2017, the entire content of which is incorporated herein by reference.

TECHNICAL FIELD

The present disclosure generally relates to the field of image processing technology and, more particularly, relates to an image processing method, a drone, and a drone-camera system.

BACKGROUND

With the continuous development of image processing technology, panoramic images have been widely used due to their large visual range and image content.

At present, when a drone uses a camera device (such as a camera, an aerial camera, and a digital camera) to capture a panoramic image, due to the limited range of rotation of the drone itself and the limited view range and rotation range of the camera device, the obtained panoramic image may not be able to, or may not be able to completely, capture the sky at the top.

Therefore, how to effectively complement the uncaptured sky image and improve the integrity of the panoramic image has become a topic of great interest. The disclosed image processing method, drone, and drone-camera system are directed to solve one or more problems set forth above and other problems in the art.

SUMMARY

One aspect of the present disclosure provides an image processing method. The image processing method includes acquiring, according to a current environmental parameter of the drone, a target sky image that matches the current environmental parameter; and determining a direction parameter of the camera device when capturing a to-be-stitched image. The to-be-stitched image is an image captured under the current environmental parameter. The method further includes stitching the target sky image with the to-be-stitched image according to the direction parameter to obtain a panoramic image.

Another aspect of the present disclosure provides a drone. The drone includes a memory and a processor. The memory is configured to store program instructions, and the processor, is configured to execute the program instructions stored in the memory. When the program instructions are executed, the processor is configured to acquire, according to a current environmental parameter, a target sky image that matches the current environmental parameter; determine a direction parameter of the camera device when capturing a to-be-stitched image; and stitch the target sky image with the to-be-stitched image according to the direction parameter to obtain a panoramic image. The to-be-stitched image is an image captured under the current environmental parameter.

Another aspect of the present disclosure provides a drone-camera system. The drone-camera system includes a camera device, and a drone. The drone includes a memory and a processor. The memory is configured to store program instructions, and the processor, is configured to execute the program instructions stored in the memory. When the program instructions are executed, the processor is configured to acquire, according to a current environmental parameter, a target sky image that matches the current environmental parameter; determine a direction parameter of the camera device when capturing a to-be-stitched image; and stitch the target sky image with the to-be-stitched image according to the direction parameter to obtain a panoramic image. The to-be-stitched image is an image captured under the current environmental parameter.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Reference will now be made in detail to exemplary embodiments of the disclosure, which are illustrated in the accompanying drawings. Wherever possible, the same reference numbers will be used throughout the drawings to refer to the same or like parts.

Figure 1:
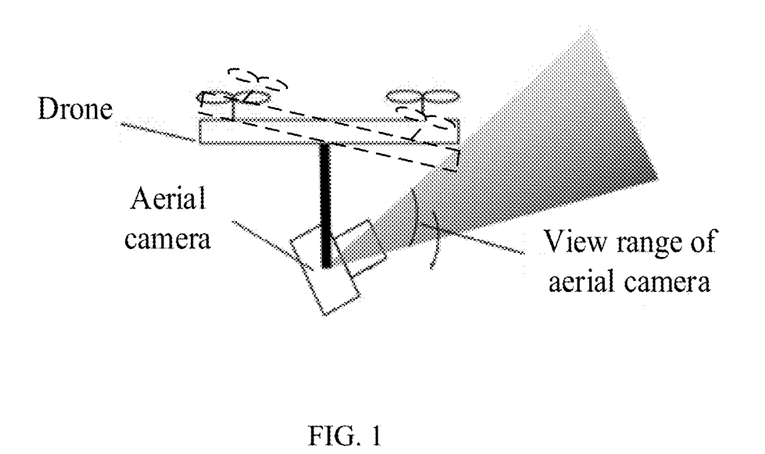
FIG. 1 illustrates a schematic structural diagram of an image processing apparatus.

In existing technology, due to the limited range of rotation of the drone itself and the limited view range and rotation range of the camera device, the panoramic image taken by a drone-camera system (e.g. a drone equipped or otherwise associated with a camera) may not be able to capture the sky at the top, or may not be able to completely capture the sky at the top. FIG. 1 illustrates a schematic structural diagram of an image processing apparatus. For example, a drone equipped or otherwise associated with an aerial camera is described as an example of the image processing apparatus. When taking a panoramic image, the drone is unable to rotate 90 degrees or even more than 90 degrees. Although the aerial camera may be able to rotate 90 degrees or even more than 90 degrees, due to the limited view range of the aerial camera, blocking the view of the aerial camera by the drone cannot be avoided, making it still impossible to capture the sky at the top.

The present disclosure provides an image processing method. The image processing method may be applied to an image processing apparatus. The structural diagram of the image processing apparatus may be consistent with the schematic structural diagram of the system architecture illustrated in FIG. 1. The system architecture may include a drone and a camera device. As shown in FIG. 1, an aerial camera is taken as an example for the camera device. In other embodiments, the aerial camera may be replaced with a camera, a digital camera, an infrared camera, etc. and the present disclosure does not impose any limitation. The drone may be used for image processing. Although not shown, the drone may specifically include a processor, a communication unit, a flight control unit, a sensor, etc.

When a drone is equipped or otherwise associated with an aerial camera to capture the panoramic image, it usually takes two steps, i.e. capturing and stitching, to complete the panoramic image. Specifically, the drone can keep its own position coordinates unchanged, and control the drone body and/or the aerial camera to rotate to obtain images corresponding to different view ranges. The view range of the aerial camera shown in FIG. 1 may be the view range indicated by a shaded portion, and the view range may be represented by a field of view (FOV). By changing the attitude of the aerial camera, the FOV image corresponding to each attitude of the aerial camera can be obtained.

The body of the drone may not be rotated, or may be rotated in accordance with the attitude change of the aerial camera. For example, when the aerial camera is rotated to the illustrated position, the drone may be able to adjust the fuselage from the dotted line position of the drone to the solid line position of the drone to avoid blocking the view of the aerial camera.

In one embodiment, the drone may be able to stitch the captured images according to the attitude, the feature-matching information, etc. to generate a panoramic image. In addition, in an image-viewing mode which simulates the normal human FOV, the user may be able view the content acquired in various directions during the picture-capture period of the camera.

However, when capturing the sky at the top of the panoramic image, the drone may need to keep the position coordinates fixed, and the rotation range of the body is limited, and it is impossible to rotate 90 degrees or more. Although the aerial camera is able to perform a rotation of 90 degrees or more, it may still be impossible to capture the sky at the top even when both of them change their attitudes at the same time. Therefore, how to complement the portion of the sky at the top has become a hot topic to be solved.

In order to solve the above technical problem, the present disclosure provides an image processing method, a drone, and a drone-camera system.

In one embodiment, the drone may be able to control the camera to capture a to-be-stitched image that needs sky stitching, and then may be able to determine the environmental parameter at the capturing time, such as one or more of the time parameter, the height parameter, and the position parameter, etc. Then, the drone may be able to acquire, according to the environmental parameter, a target sky image that matches the environmental parameter; and according to the direction parameter of the to-be-stitched image at the capturing time (for example, the capturing direction is 45 degrees toward the southwest, etc.), stitch the target sky image and the to-be-stitched image together to obtain a panoramic image.

In one embodiment, the target sky image may be determined from a meteorological satellite image. The drone may be connected to the weather database via a wireless link, and the drone may acquire, according to the environmental parameter, a meteorological satellite image that matches the environmental parameter, and according to the meteorological satellite image, obtain the target sky image.

In one embodiment, the drone may obtain the target sky image according to the meteorological satellite image. For example, the drone may perform feature recognition processing on the meteorological satellite image, distinguish the cloud layer image from the surface image, and then perform the amplification and resolution filling processing on the cloud layer image. After that, the drone may generate the target sky image.

In one embodiment, the drone may obtain the target sky image according to the meteorological satellite image. For example, the drone may pre-establish a material library, where the material library may include a pre-established set of sky images, and then the meteorological satellite image may be compared with the sky images in the material library, and the matching sky image may be selected as the target sky image.

In one embodiment, the drone may obtain the target sky image according to the meteorological satellite image. For example, the drone may perform image recognition processing on the meteorological satellite image to obtain sky description information of the meteorological satellite image (e.g., cloud thickness, cloud size, cloud shape, etc.), and a virtual sky image may be generated based on the sky description information, and the virtual sky image may be used as the target sky image.

The image processing methods described above are able to determine, according to the current environmental parameter, the target sky image that needs to be stitched with the to-be-stitched image to realize the stitching of the panoramic image. Because the target sky image is obtained according to the environmental parameter, the panoramic image obtained by stitching may have desired picture consistency. In addition, when stitching the sky, the stitching process is automatically performed by the drone, and thus the degree of automation is high. In addition, the user is able to quickly preview the stitching effect of the panoramic image, which demonstrates desired real-time performance.

In the following, various embodiments of the present disclosure will be described in detail for further illustration.

Figure 2:
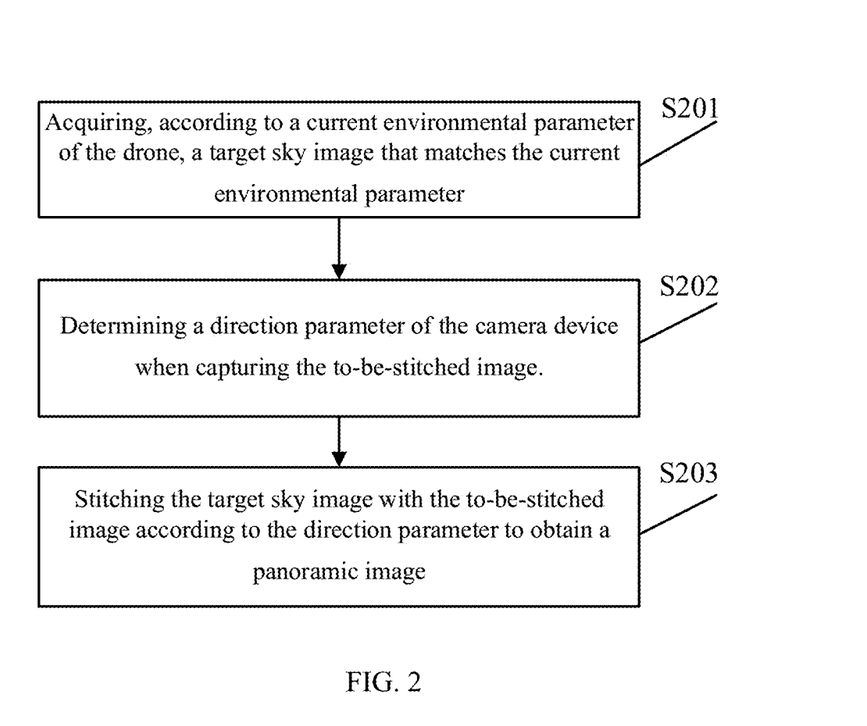
FIG. 2 illustrates a schematic flowchart of an exemplary image processing method according to some embodiments of the present disclosure.

FIG. 2 illustrates a schematic flowchart of an exemplary image processing method according to some embodiments of the present disclosure. Referring to FIG. 2, the image processing method may include the following exemplary steps.

In S201, acquiring, according to a current environmental parameter of the drone, a target sky image that matches the current environmental parameter.

It should be noted that the execution body of the embodiment of the present disclosure may be a drone. The drone may refer to an unmanned aerial device.

In one embodiment, the environmental parameter may include one or more of the time parameter, the height parameter, and the position parameter.

It should be noted that the environmental parameter may refer to the current environment of the drone when capturing a to-be-stitched image. For example, it may include the current time, the flying height of the drone, the position of the drone, the direction (orientation) of the drone, etc.

It should also be noted that the target sky image can be stitched onto the to-be-stitched image to complement the missing portion of the sky in the to-be-stitched image.

It should also be noted that the target sky image matching the current environmental parameter may refer to the sky environment represented in the target sky image matching the environmental parameter acquired by the drone.

For example, the environmental parameter is expressed as cloudy weather, the humidity is 28, and the visibility is low. Therefore, in the target sky image, the cloud layer may be low and thick, and the sky color may be grayish white to indicate the cloudy weather.

In one embodiment, the acquiring, according to the current environmental parameter of the drone, the target sky image that matches the current environmental parameter may include: according to the current environmental parameter of the drone, acquiring a meteorological satellite image that matches the current environmental parameter; and according to the meteorological satellite image, acquiring the target sky image.

In some embodiments, the meteorological satellite image may be acquired by a meteorological satellite and may be disclosed to a network, and the drone may acquire the meteorological satellite image through the network.

In some embodiments, the meteorological satellite image may also be acquired by a surveillance satellite, a high-altitude aircraft, an airship, etc., and the present disclosure does not impose any limitation.

In one embodiment, the drone may acquire a meteorological satellite image in real time, and according to the current environmental parameter, determine a meteorological satellite image that matches the environmental parameter, and obtain the target sky image according to the meteorological satellite image.

In one embodiment, the acquiring, according to the current environmental parameter of the drone, the target sky image that matches the current environmental parameter may include: determining at least one user identifier according to the environmental parameter of the drone; corresponding to each of the at least one user identifier, acquiring a sky image; and selecting, from the acquired sky images, a matching sky image that matches the environmental parameter as the target sky image.

It should be noted that the user identifier may refer to a user account, a user avatar, etc., that is used to identify the identity of the user.

In some embodiments, the drone may be able to establish a connection with a material library, and the material library may include a plurality of sky images with the sky image corresponding to a user identifier. The drone may be able to determine, according to the location information of the drone, a user identifier with a distance from the location information within a preset range (for example, 10 meters, 20 meters, 50 meters, etc.); and obtain the sky images corresponding to the user identifier. The sky images may be images of the sky captured by the user. The drone may also be able to select, from the acquired sky images, a matching sky image that matches the environmental parameter as the target sky image.

In one embodiment, the material library may be displayed in a form of an application or a website, and the present disclosure does not impose any limitation.

In one embodiment, the matching sky image may refer to a sky image that matches the environmental parameter and corresponds to the user identifier. There may be more than one matching sky images, or may be only one matching sky image. When there is only one matching sky image, the drone may use it as the target sky image.

In one embodiment, when there are more than one matching sky images, the selecting, from the acquired sky images, the matching sky image that matches the environmental parameter as the target sky image may include: sorting the matching sky images according to the degree of matching between the matching sky images and the environmental parameter, and pushing the sorting results to the display interface; and in response to a determining operation received at the display interface, obtaining the target sky image according to the matching sky image indicated by the determining operation.

It should be noted that the degree of matching between the matching sky image and the environmental parameter may be calculated by the drone.

In some embodiments, the drone may be able to extract sky feature parameters in each matching sky image, then match each sky feature parameter with the environmental parameter, and determine the degree of matching between each sky feature parameter and the environmental parameter.

For example, when the environmental parameter indicates that the current weather is cloudy, the drone may be able to calculate that the degree of matching between the matching sky image, where the cloud type is cumulonimbus cloud and the sky color is grayish white, and the environmental parameter is 90%, and the degree of matching between the matching sky image, where the cloud type is cirrus and the sky color is blue, and the environmental parameter is 30%.

Further, the drone may be able to sort the matching sky images according to the degree of matching. For example, the matching sky image with a degree of matching of 70% may be ranked as the first, and the matching sky image with a degree of matching of 30% may be ranked as the second, and the sort result may be pushed to the display interface.

In one embodiment, the display interface may be a display interface for human-computer interaction, and the display interface may be set on the drone or on other devices (such as a mobile phone, a computer, etc.). When the display interface is set on another device, the drone may be able to establish a connection with the other device through a wireless connection (such as Bluetooth, infrared, mobile data network, etc.), and push the sorting results to the other device, so that the sorting results can be displayed on the display interface of the other device.

In some embodiments, the user may be able to select and determine the target sky image on the display interface. For example, the user may select and determine the matching sky image on the display interface, and the drone may use the matching sky image determined by the user as the target sky image.

In S202, determining a direction parameter of the camera device when capturing the to-be-stitched image.

It should be noted that the direction parameter when the to-be-stitched image is photographed may refer to a sight orientation, a viewing angle, etc. of the to-be-stitched image at the capturing time.

For example, when the image content in the to-be-stitched image is the content that can be viewed straight along the view sight, then the direction parameter of the to-be-stitched image may be straight along the view sight.

For example, the drone is located on the upper left side of a building, and shoots 45 degrees toward the lower right using the camera to obtain a to-be-stitched image a. In the to-be-stitched image a, the building may be located at the right lower side of the image. Then, the drone may determine that, according to the orientation and position of the building in the to-be-stitched image a and the FOV of the camera device, the direction parameter of the to-be-stitched image at the capturing time is 45 degrees to the low right of the view sight.

In some embodiments, the direction parameter may include an attitude angle (e.g., Yaw, Roll, Pitch), and the attitude angle may be obtained by an inertial measurement unit.

For example, the drone may define a building in the north as Yaw0 degree. A building may be located in a direction of 30 degrees East of North with respect to the drone. At the same time, the camera may shoot at 45 degrees downwards. The drone body does not roll when capturing images, and thus the direction parameter for the building can be recorded as: Yaw=30 degrees, Roll=0 degree, and Pitch=−45 degrees.

In S203, stitching the target sky image with the to-be-stitched image according to the direction parameter to obtain a panoramic image.

It should be noted that the drone can be used to complete the sky image according to a panoramic stitching algorithm.

In some embodiments, the drone may be able to perform mapping, splicing, feathering, smearing, exposure compensation, tone adjustment, etc. on the target sky image and the stitched image through professional image editing software, and obtain the panoramic image.

For example, the panoramic image may be a panoramic view covering a horizontal angle of 360 degrees and a vertical angle of 180 degrees without any dead angle. Alternatively, the panoramic image may be an image obtained according to other coverage angles, and the present disclosure does not impose any limitation.

In one embodiment, the stitching the target sky image with the to-be-stitched image according to the direction parameter to obtain the panoramic image may include: determining a stitching direction of the target sky image according to the direction parameter; extracting edge feature points of the target sky image; and stitching the target sky image and the to-be-stitched image together according to the edge feature points and the stitching direction of the target sky image to obtain the panoramic image.

It should be noted that the stitching direction of the target sky image may refer to a stitching position where the target sky image is spliced onto the to-be-stitched image.

In one embodiment, an edge feature point may refer to an edge pixel value or the like in the target sky image.

For example, when the direction parameter of the to-be-stitched image is the upper right of the view sight, the drone may be able to determine that the stitching direction of the target sky image is the upper left direction of the to-be-stitched image. Then, the drone may extract the edge pixel value of the sky image target and perform stitching process, such as smoothing, filtering, etc., on the edge pixel value and the pixel value of the sky edge in the to-be-stitched image to obtain the panoramic image.

It should also be noted that after obtaining the panoramic image, the user may be able to view the images acquired in various directions during the image-capturing period of the camera device in an image-viewing mode which simulates the normal human FOV.

It can be seen that, according to the embodiments of the present disclosure, the drone is able to acquire, according to the current environmental parameter, a target sky image that matches the current environmental parameter, and then stitch, according to the direction parameter when the to-be-stitched image is captured, the target sky image and the to-be-stitched image together to obtain a panoramic image. The sky image can be obtained according to the environmental parameter of the drone, and the obtained sky image is a real image, which effectively complements the portion of the sky image that is not captured, and improves the authenticity and integrity of the panoramic image.

Figure 3A:
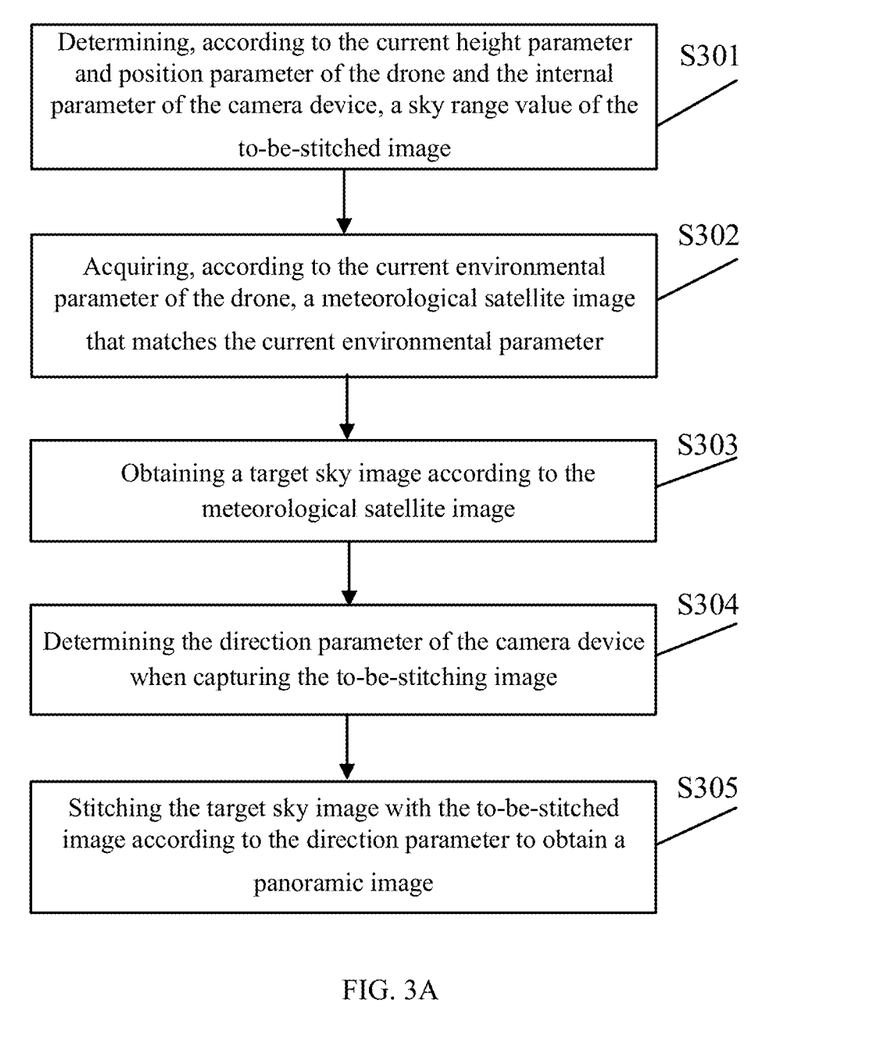
FIG. 3A illustrates a schematic flowchart of another exemplary image processing method according to some embodiments of the present disclosure.

FIG. 3A illustrates a schematic flowchart of another exemplary image processing method according to some embodiments of the present disclosure. Referring to FIG. 3A, the image processing method may include the following exemplary steps.

In S301, determining, according to the current height parameter and position parameter of the drone and the internal parameter of the camera device, a sky range value of the to-be-stitched image.

It should be noted that the current height parameter of the drone can be, for example, the altitude of the current position of the drone, or the height from the ground, etc.

It should also be noted that the position parameter may be used to indicate the current position of the drone, for example, may be the position coordinates at which the drone is currently located.

It should be noted that the internal parameter of the camera device may be an internal parameter such as a focal length, a pixel, an FOV, etc. of the camera device, and the present disclosure does not impose any limitation.

In some embodiments, the drone may first determine the length, width, size, area, etc. of the sky portion in the to-be-stitched image according to the current height parameter, the position parameter, and the internal parameter of the camera device, and then may predict the range of the size, area, etc. of the sky portion that needs to be complemented when the to-be-stitched image is made into the panoramic image.

In S302, acquiring, according to the current environmental parameter of the drone, a meteorological satellite image that matches the current environmental parameter.

It should be noted that the implementation process of S302 shown in the embodiment of the present disclosure may refer to the step of S201 in the aforementioned embodiment of the method, and details are not described herein again.

In S303, obtaining a target sky image according to the meteorological satellite image.

It should be noted that the drone may be able to perform image processing on the meteorological satellite image and obtain the target sky image.

Figure 3B:
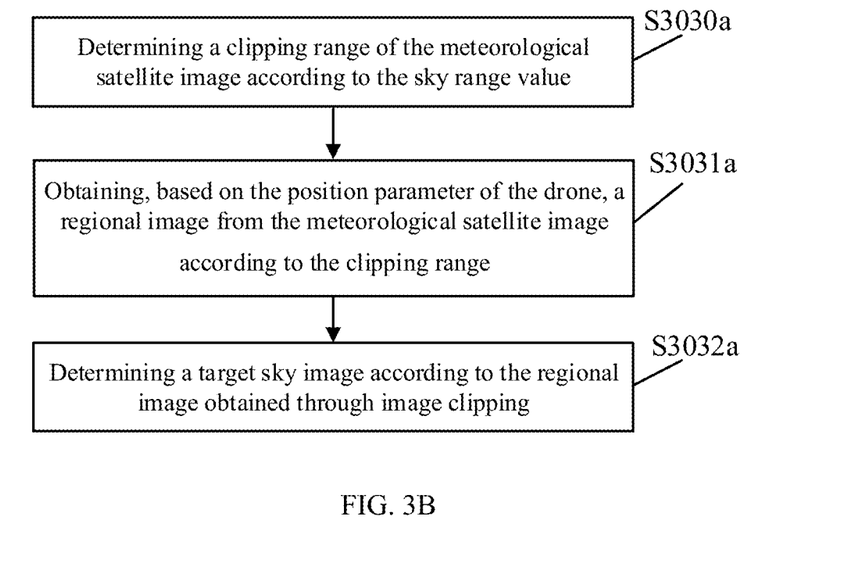
FIG. 3B illustrates a schematic flowchart of another exemplary image processing method according to some embodiments of the present disclosure.

FIG. 3B illustrates a schematic flowchart of another exemplary image processing method according to some embodiments of the present disclosure. Referring to FIG. 3B, in one embodiment, the drone may be able to obtain a target sky image from the meteorological satellite image according to the following steps.

In S3030a, determining a clipping range of the meteorological satellite image according to the sky range value.

It should be noted that the drone may first determine the sky range value of the to-be-stitched image, and then determine the range value of the sky portion that needs to be complemented when the to-be-stitched image is made into a panoramic image. According to the range value of the sky portion that needs to be complemented, the clipping range of the meteorological satellite image may be obtained.

It should be noted that the clipping range of the meteorological satellite image may be the range value of the sky portion that needs to be complemented, or may be larger than the range value of the sky portion that needs to be complemented. The present disclosure does not impose any limitation.

In S3031a, obtaining, based on the position parameter of the drone, a regional image from the meteorological satellite image according to the clipping range.

It should be noted that the regional image may refer to an image taken from the meteorological satellite image.

It should also be noted that the drone is able to determine, based on the position parameter, the meteorological satellite image within a preset range of the position parameter, and then obtain, according to the determined clipping range, the regional image from the meteorological satellite image.

In one embodiment, the obtaining, based on the position parameter of the drone, the regional image from the meteorological satellite image according to the clipping range may include: taking the position of the drone as the clipping center and obtaining, according to the clipping range, the regional image from the meteorological satellite image.

It should be noted that the position of the drone may be the center of the regional image, that is, the drone may be able to take the position of the drone as a center, and then intercept the meteorological satellite image according to the center.

For example, the drone may take the position of the drone as a center, take the clipping range as a circular area, and obtain the regional image by selecting a circular area.

In one embodiment, the obtaining the regional image from the meteorological satellite image according to the clipping range may include: performing feature recognition processing on the meteorological satellite image to obtain a cloud layer image of the meteorological satellite image; obtaining the regional image from the cloud layer image according to the clipping range.

It should be noted that the drone may be able to identify the cloud part, the surface part, the sea part, etc. of the meteorological satellite image, and use the cloud part of the meteorological satellite image as the cloud layer image of the meteorological satellite image. Then, the drone may be able to intercept the cloud layer image according to the clipping range to obtain the regional image.

In S3032a, determining a target sky image according to the regional image obtained through image clipping.

In one embodiment, the determining the target sky image according to the regional image obtained through image clipping may include: performing an enlargement process on the regional image obtained through image clipping; determining a target image from the enlarged regional image, and obtaining the target sky image according to the target image.

For example, the regional image may be an image intercepted from the cloud layer image. The drone may first enlarge the regional image, determine a target image that can be smoothly stitched with the sky part of the to-be-stitched image from the enlarged regional image, and obtain the target sky image according to the target image.

In one embodiment, the performing the enlargement process on the regional image obtained through image clipping may include: determining a height parameter of the meteorological satellite image and a height parameter of the drone; and determining, according to the height parameter of the meteorological satellite image and the height parameter of the drone, a scale value for performing the enlargement process on the regional image obtained through image clipping; and enlarging the regional image obtained through image clipping according to the scale value.

For example, the altitude parameter of the meteorological satellite image may be an altitude of 600,000 meters, the height parameter of the drone may be 3,000 meters above sea level, and the drone may be able to determine the scale value for performing the enlargement process on the regional image obtained through image clipping to be 600000/30000=200. Therefore, the drone may be able to enlarge the regional image obtained through image clipping according to the scale value of 200 times.

In another example, the height parameter of the drone may be 500 meters above sea level, the height of the cloud may be 5000 meters, and the height of the satellite may be 60,000 meters. The drone is able to determine that the regional image obtained through image clipping may be enlarged according to the ratio of the distance from the drone to the cloud layer to the distance from the satellite to the cloud layer. In this example, the ratio value may be (60000−5000)/(5000−500)=132, and thus the drone may be able to enlarge the regional image obtained through image clipping based on a magnification value of 132. In one embodiment, the cloud height may be inputted through the user interaction, or may be estimated according to the local weather conditions.

In some embodiments, the drone may directly use the enlarged regional image as the target sky image.

In one embodiment, the method may further include: performing resolution filling on the enlarged regional image to obtain the target sky image.

It should be noted that the resolution of the enlarged regional image may not meet the requirement, and the drone may perform resolution filling on the enlarged regional image to obtain the target sky image, which may improve the resolution of the regional image after the enlargement processing, and also improve the picture consistency of the panoramic image.

Figure 3C:
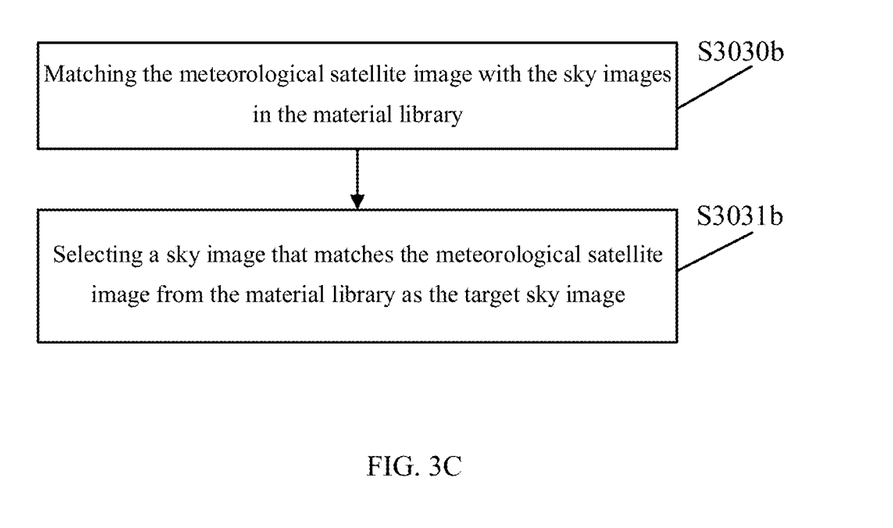
FIG. 3C illustrates a schematic flowchart of another exemplary image processing method according to some embodiments of the present disclosure.

FIG. 3C illustrates a schematic flowchart of another exemplary image processing method according to some embodiments of the present disclosure. Referring to FIG. 3C, the drone obtaining a target sky image according to the meteorological satellite image may be implemented according to the following exemplary steps.

In S3030b, matching the meteorological satellite image with the sky images in the material library.

In one embodiment, the material library may include a pre-established set of sky images.

It should be noted that the pre-established set of sky images may include sky images captured by the user, or may include simulated sky images. The present disclosure does not impose any limitation.

In one embodiment, the matching the meteorological satellite image with the sky image in the material library may include: matching one or more of the visible light cloud map, the infrared light cloud map, the water vapor cloud map, the surface temperature map, and the sea surface temperature map in the meteorological satellite image with the sky images in the material library.

For example, the drone may be able to determine the cloud transparency, the thickness of the cloud layer, the type of the cloud, etc. according to the visible light cloud map in the meteorological satellite image, and then match the sky images in the material library according to the determined cloud information. Specifically, the visible cloud may be cloud information representing a sunny day, and the drone may be able to match with a sky image that also represents a sunny day.

In S3031b, selecting a sky image that matches the meteorological satellite image from the material library as the target sky image.

In some embodiments, the drone may be able to select a sky image that best matches the meteorological satellite image from the material library as the target sky image.

In some embodiments, the drone may also be able to select a plurality of sky images matching the meteorological satellite image from the material library, and then the user may select one of the sky images as the target sky image.

Figure 3D:
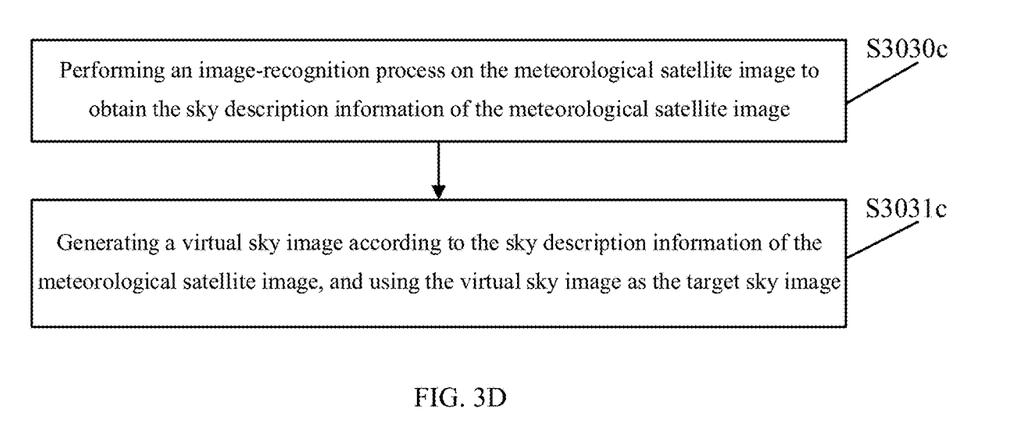
FIG. 3D illustrates a schematic flowchart of another exemplary image processing method according to some embodiments of the present disclosure.

In one embodiment, referring to FIG. 3D, the drone obtaining a target sky image according to the meteorological satellite images may be implemented through the following exemplary steps.

In S3030c, performing an image-recognition process on the meteorological satellite image to obtain the sky description information of the meteorological satellite image.

In one embodiment, the sky description information may include one or more of the description information obtained based on the visible light cloud map, the description information obtained based on the infrared light cloud map, the description information obtained based on the water vapor cloud map, the description information obtained on the surface temperature map, and the description information obtained based on the sea surface temperature map.

It should be noticed that the sky description information may refer to information obtained based on the sky, such as the cloud thickness, the cloud size, the cloud type, the sky color, etc.

In some embodiments, the drone may be able to perform an image-recognition process according to the meteorological satellite image (including a visible light cloud map, an infrared light cloud map, a water vapor cloud map, a surface temperature map, etc.), and obtain the sky description information such as the cloud thickness, the cloud size, the cloud type, the sky color, etc.

In S3031c, generating a virtual sky image according to the sky description information of the meteorological satellite image, and using the virtual sky image as the target sky image.

In some embodiment, the drone may be able to perform three-dimensional modeling of the cloud according to the sky description information described above, and may generate a virtual sky image using an image rendering method and use the virtual sky image as the target sky image.

In S304, determining the direction parameter of the camera device when capturing the to-be-stitching image.

In S305, stitching the target sky image with the to-be-stitched image according to the direction parameter to obtain a panoramic image.

It should be noted that the implementation process of S304 and S305 shown in the embodiment of the present disclosure may refer to the step of S202 and the step of S203, respectively in the aforementioned embodiment of the method, and details are not described herein again.

It can be seen that, according to the embodiments of the present disclosure, the drone is able to acquire, according to the current environmental parameter, a meteorological satellite image that matches the current environmental parameter; determine the direction parameter of the camera device when capturing the to-be-stitched image; and stitching the target sky image with the to-be-stitched image according to the direction parameter to obtain the panoramic image. As such, stitching for panoramic image may be realized. In addition, because the target sky image is obtained according to meteorological satellite images, the sky part may be highly real, thereby improving the picture consistency of the panoramic image. In addition, when stitching the sky, the stitching process is automatically performed by the drone, and thus the degree of automation is high. In addition, the user is able to quickly preview the stitching effect of the panoramic image, which demonstrates desired real-time performance.

Figure 4:
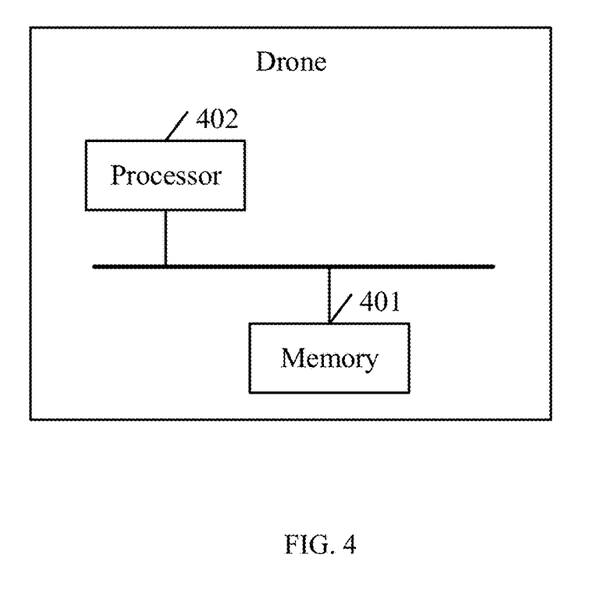
FIG. 4 illustrates a schematic structural diagram of an exemplary drone according to some embodiments of the present disclosure.

The present disclosure also provides a drone, and FIG. 4 illustrates a schematic structural diagram of an exemplary drone according to some embodiments of the present disclosure. Referring to FIG. 4, the drone according to the present disclosure may include a memory 401 and a processor 402.

The memory 401 may be configured to store program instructions;

The processor 402 may be configured to execute the program instructions stored in the memory. When the program instructions are executed, the processor 402 may be configured to:

acquire, according to a current environmental parameter, a target sky image that matches the current environmental parameter;

determine the direction parameter of the camera device when capturing the to-be-stitched image, where the to-be-stitched image is an image captured under the current environmental parameter; and stitch the target sky image with the to-be-stitched image according to the direction parameter to obtain a panoramic image.

In one embodiment, when acquiring, according to the current environmental parameter, the target sky image that matches the current environmental parameter, the processor 402 may be configured to:

according to the current environmental parameter of the drone, acquire a meteorological satellite image that matches the current environmental parameter; and obtain the target sky image according to the meteorological satellite image.

In one embodiment, the environmental parameter may include one or more of the time parameter, the height parameter, and the position parameter.

In one embodiment, prior to obtaining the target sky image according to the meteorological satellite image, the processor 402 may be configured to:

determine, according to the current height parameter and position parameter of the drone and the internal parameter of the camera device, a sky range value of the to-be-stitched image.

In one embodiment, when obtaining the target sky image according to the meteorological satellite image, the processor 402 may be configured to:

determine a clipping range of the meteorological satellite image according to the sky range value;

obtain, based on the position parameter of the drone, a regional image from the meteorological satellite image according to the clipping range; and determine the target sky image according to the regional image obtained through image clipping.

In one embodiment, when obtaining, based on the position parameter of the drone, the regional image from the meteorological satellite image according to the clipping range, the processor 402 may be configured to:

take the position of the drone as the clipping center and obtain, according to the clipping range, the regional image from the meteorological satellite image.

In one embodiment, when obtaining, based on the position parameter of the drone, a regional image from the meteorological satellite image according to the clipping range, the processor 402 may be configured to:

perform feature recognition processing on the meteorological satellite image to obtain a cloud layer image of the meteorological satellite image; and obtain the regional image from the cloud image according to the clipping range.

In one embodiment, when determining the target sky image according to the regional image obtained through image clipping, the processor 402 may be configured to:

perform an enlargement process on the regional image obtained through image clipping; and determine a target image from the enlarged regional image, and obtain the target sky image according to the target image.

In one embodiment, when performing the enlargement process on the regional image obtained through image clipping, the processor 402 may be configured to:

determine a height parameter of the meteorological satellite image and a height parameter of the drone;

determine, according to the height parameter of the meteorological satellite image and the height parameter of the drone, a scale value for performing the enlargement process on the regional image obtained through image clipping; and enlarge the regional image obtained through image clipping according to the scale value.

In one embodiment, the processor 402 may also be configured to:

perform resolution filling on the enlarged regional image to obtain the target sky image.

In one embodiment, when obtaining the target sky image according to the meteorological satellite image, the processor 402 may be configured to:

match the meteorological satellite image with the sky images in the material library, where the material library may include a pre-established set of sky images; and select a sky image that matches the meteorological satellite image from the material library as the target sky image.

In one embodiment, when matching the meteorological satellite image with the sky images in the material library, the processor 402 may be configured to:

match one or more of the visible light cloud map, the infrared light cloud map, the water vapor cloud map, the surface temperature map, and the sea surface temperature map in the meteorological satellite image with the sky images in the material library.

In one embodiment, when obtaining the target sky image according to the meteorological satellite image, the processor 402 may be configured to:

perform an image-recognition process on the meteorological satellite image to obtain the sky description information of the meteorological satellite image; and generate a virtual sky image according to the sky description information of the meteorological satellite image, and use the virtual sky image as the target sky image.

In one embodiment, the sky description information may include:

one or more of the description information obtained based on the visible light cloud map, the description information obtained based on the infrared light cloud map, the description information obtained based on the water vapor cloud map, the description information obtained on the surface temperature map, and the description information obtained based on the sea surface temperature map.

In one embodiment, when acquiring, according to the current environmental parameter, the target sky image that matches the current environmental parameter, the processor 402 may be configured to:

determine at least one user identifier according to the environmental parameter of the drone;

corresponding to each of the at least one user identifier, acquire a sky image; and select, from the acquired sky images, a matching sky image that matches the environmental parameter as the target sky image.

In one embodiment, when selecting, from the acquired sky images, the matching sky image that matches the environmental parameter as the target sky image, the processor 402 may be configured to:

sort the matching sky images according to the degree of matching between the matching sky images and the environmental parameter and push the sorting results to the display interface; and in response to receiving a determining operation at the display interface, obtain the target sky image according to the matching sky image indicated by the determining operation.

In one embodiment, when stitching the target sky image with the to-be-stitched image according to the direction parameter to obtain the panoramic image, the processor 402 may be configured to:

determine a stitching direction of the target sky image according to the direction parameter;

extract edge feature points of the target sky image; and stitch the target sky image and the to-be-stitched image together according to the edge feature points and the stitching direction of the target sky image to obtain the panoramic image.

Figure 5:
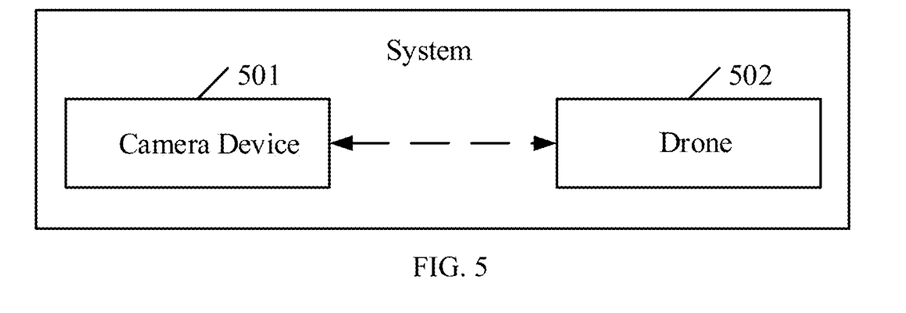
FIG. 5 illustrates a schematic structural diagram of an exemplary drone-camera system according to some embodiments of the present disclosure.

Further, the present disclosure also provides a drone-camera system. FIG. 5 illustrates a schematic structural diagram of an exemplary drone-camera system according to some embodiments of the present disclosure. Referring to FIG. 5, the system may include a camera device 501 and a drone 502.

According to the disclosed drone-camera system, the drone 502 is a drone provided in the present disclosure, and the principles and implementations are similar to the embodiments described above. The details of the drone is not described herein again.

According to the disclosed drone-camera system, the camera device 501 may be disposed on the drone 502, and may be configured to capture a to-be-stitched image.

Figure 5A:
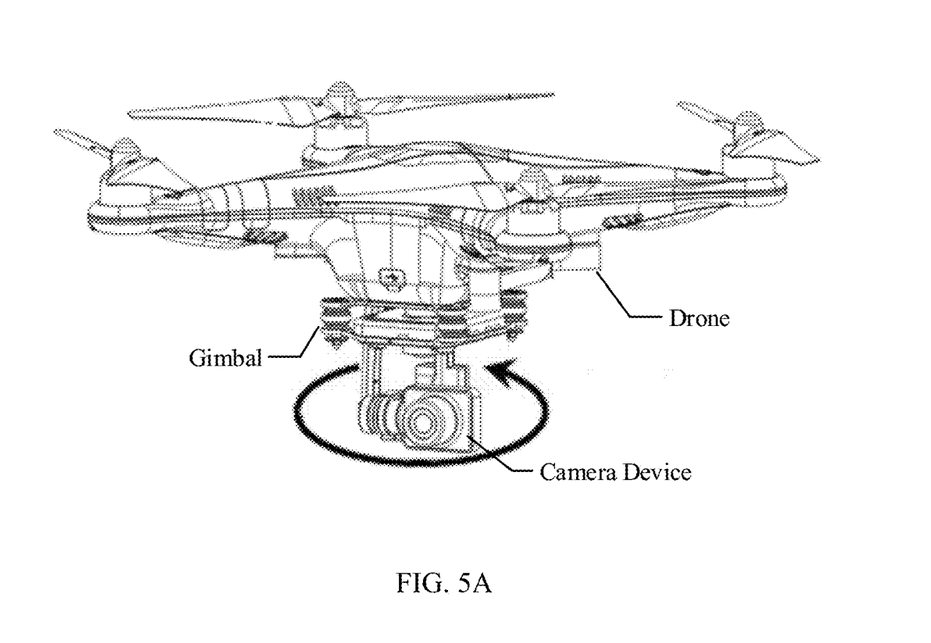
FIG. 5A illustrates a schematic structural diagram of another exemplary drone-camera system according to some embodiments of the present disclosure.

FIG. 5A illustrates a schematic structural diagram of another exemplary drone-camera system according to some embodiments of the present disclosure. Referring to FIG. 5, in one embodiment, the camera device may be mounted on the main body of the drone through a gimbal or other mounting equipment. The camera device may be used for image or video capturing during flight of the drone, and may include but not limited to a multi-spectral imager, a hyper-spectral imager, a visible light camera, an infrared camera, etc. Moreover, the number of camera devices disposed on the drone may be one or more than one. According to the disclosed system, the drone may be able to keep the fuselage hovering in the air, and the camera may rotate in a horizontal plane in a direction indicated by an arrow shown in the figure. In addition, other axes may be able to provide jitter compensation to capture the to-be-stitched image corresponding to each attitude of the camera device.

According to the disclosed system, the drone 502 is able to acquire, according to the current environmental parameter, the target sky image that matches the current environmental parameter; determine the direction parameter of the camera device when capturing the to-be-stitched image, where the to-be-stitched image is an image captured under the current environmental parameter; and stitch the target sky image with the to-be-stitched image according to the direction parameter to obtain a panoramic image.

It should be noted that the drone 502 may be used to perform the image processing method described in various embodiments provided in the present disclosure. For the specific implementation process, reference may be made to the embodiments, and the details are not described herein again.

It should be noted that for illustrative purposes, the various embodiments of the disclosed method provided above are described as a series of action combinations, but those skilled in the art should understand that the present disclosure is not limited by the described sequence of the actions. Therefore, according to the present disclosure, some steps may be performed in other orders, or may be performed simultaneously. In addition, those skilled in the art should also understand that the embodiments described in the present disclosure are all exemplary embodiments, and the actions and modules involved are not necessarily required by the present disclosure.

Further, those skilled in the art may understand that all or part of the steps of the embodiments described above may be implemented by using a program to instruct related hardware. The program may be stored in a computer readable storage medium, and the storage medium may include: Flash disk, Read-Only Memory (ROM), Random Access Memory (RAM), disk, optical disk, etc.

According to various embodiments of the present disclosure, the target sky image matching the current environmental parameter may be acquired according to the current environmental parameter of the drone, and then the target sky image and the to-be-stitched image are stitched together according to the direction parameter when the to-be-stitched image is captured to obtain a panoramic image. Therefore, the disclosed image processing method, drone, and drone-camera system are able to obtain a sky image according to the environmental parameter of the drone, and thus may improve the integrity of the panoramic image.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. An image processing method, applied to a drone, comprising:
    acquiring, according to a current environmental parameter of the drone, a meteorological satellite image that matches the current environmental parameter;
    obtaining, according to the meteorological satellite image, a target sky image that matches the current environmental parameter;
    determining a direction parameter of a camera device associated with the drone when capturing a to-be-stitched image, wherein the to-be-stitched image is an image captured under the current environmental parameter; and
    stitching the target sky image with the to-be-stitched image according to the direction parameter to obtain a panoramic image, wherein:
    the target sky image is obtained by one of: an imaging clipping, a selection from a material library, and an image-recognition process,
        wherein obtaining the target sky image by the image clipping includes:
            determining, according to a sky range value of the to-be-stitched image, a clipping range of the meteorological satellite image;
            obtaining, based on a position parameter of the drone, a regional image from the meteorological satellite image according to the clipping range; and
            determining, according to the regional image obtained through image clipping, the target sky image.

2. The method according to claim 1, wherein:
    the current environmental parameter of the drone includes at least one of a time parameter, a height parameter, or a position parameter.

3. The method according to claim 2, wherein:
    when the target sky image is obtained by the image clipping, prior to obtaining the target sky image according to the meteorological satellite image, the method further comprises:
        determining a sky range value of the to-be-stitched image, according to a current height parameter and a position parameter of the drone and an internal parameter of the camera device.

4. The method according to claim 3, wherein the obtaining, based on the position parameter of the drone, the regional image from the meteorological satellite image according to the clipping range includes:
    taking a position of the drone as a clipping center and obtain, according to the clipping range, the regional image from the meteorological satellite image.

5. The method according to claim 4, wherein the obtaining, based on the position parameter of the drone, the regional image from the meteorological satellite image according to the clipping range includes:
    performing feature recognition processing on the meteorological satellite image to obtain a cloud layer image of the meteorological satellite image; and
    obtaining the regional image from the cloud image according to the clipping range.

6. The method according to claim 3, wherein the determining the target sky image according to the regional image obtained through the image clipping:
    performing an enlargement process on the regional image obtained through the image clipping; and
    determining a target image from the enlarged regional image, and obtaining the target sky image according to the target image.

7. The method according to claim 6, wherein the performing the enlargement process on the regional image obtained through the image clipping includes:
    determining a height parameter of the meteorological satellite image and a height parameter of the drone;
    determining, according to the height parameter of the meteorological satellite image and the height parameter of the drone, a scale value for performing the enlargement process on the regional image obtained through the image clipping; and
    enlarging the regional image obtained through image clipping according to the scale value.

8. The method according to claim 6, further including:
    performing resolution filling on the enlarged regional image to obtain the target sky image.

9. The method according to claim 1, wherein:
    when the target sky image is obtained by the selection from the material library, the obtaining the target sky image according to the meteorological satellite image includes:

matching the meteorological satellite image with the sky images in the material library, wherein the material library includes a pre-established set of sky images; and selecting a sky image that matches the meteorological satellite image from the material library as the target sky image.

10. The method according to claim 9, wherein the matching the meteorological satellite image with the sky images in the material library includes:

matching one or more of a visible light cloud map, an infrared light cloud map, a water vapor cloud map, a surface temperature map, and a sea surface temperature map in the meteorological satellite image with the sky images in the material library.

11. The method according to claim 1, wherein:

when the target sky image is obtained by the image-recognition process, the obtaining the target sky image according to the meteorological satellite image includes:

performing the image-recognition process on the meteorological satellite image to obtain sky description information of the meteorological satellite image; and generating a virtual sky image according to the sky description information of the meteorological satellite image, and using the virtual sky image as the target sky image.

12. The method according to claim 11, wherein the sky description information includes:

one or more of description information obtained based on a visible light cloud map, description information obtained based on an infrared light cloud map, description information obtained based on a water vapor cloud map, description information obtained on a surface temperature map, and description information obtained based on a sea surface temperature map.

13. The method according to claim 1, wherein the acquiring, according to the current environmental parameter, the target sky image that matches the current environmental parameter includes:

determining at least one user identifier according to the environmental parameter of the drone;

corresponding to each of the at least one user identifier, acquiring a sky image; and selecting, from acquired sky images, a matching sky image that matches the environmental parameter as the target sky image.

14. The method according to claim 13, wherein the selecting, from the acquired sky images, the matching sky image that matches the environmental parameter as the target sky image includes:

sorting matching sky images according to a degree of matching between the matching sky images and the environmental parameter, and pushing sorting results to a display interface; and in response to a determining operation received at the display interface, obtaining the target sky image according to the matching sky image indicated by the determining operation.

15. The method according to claim 1, wherein the stitching the target sky image with the to-be-stitched image according to the direction parameter to obtain the panoramic image includes:

determining a stitching direction of the target sky image according to the direction parameter;

extracting edge feature points of the target sky image; and stitching the target sky image and the to-be-stitched image together according to the edge feature points and the stitching direction of the target sky image to obtain a panoramic image.

16. A drone, comprising:

a memory and a processor, wherein:

the memory is configured to store program instructions; and the processor, is configured to execute the program instructions stored in the memory, and when the program instructions are executed, the processor is configured to:

acquire, according to a current environmental parameter of the drone, a meteorological satellite image that matches the current environmental parameter;

obtain, according to the meteorological satellite image, a target sky image that matches the current environmental parameter;

determine a direction parameter of the camera device associated with the drone when capturing a to-be-stitched image, wherein the to-be-stitched image is an image captured under the current environmental parameter; and stitch the target sky image with the to-be-stitched image according to the direction parameter to obtain a panoramic image, wherein:

the target sky image is obtained by one of: an imaging clipping, a selection from a material library, and an image-recognition process, wherein when the target sky image is obtained by the image clipping, the processor is further configured to:

determine, according to a sky range value of the to-be-stitched image, a clipping range of the meteorological satellite image;

obtain, based on a position parameter of the drone, a regional image from the meteorological satellite image according to the clipping range; and determine, according to the regional image obtained through the image clipping, the target sky image.

17. The drone according to claim 16, wherein:

the current environmental parameter of the drone includes one or more of a time parameter, a height parameter, and a position parameter.

18. A drone-camera system, comprising:

a camera device, and a drone, including a memory and a processor, wherein:

the memory is configured to store program instructions; and the processor, is configured to execute the program instructions stored in the memory, and when the program instructions are executed, the processor is configured to:

acquire, according to a current environmental parameter of the drone, a meteorological satellite image that matches the current environmental parameter;

obtain, according to the meteorological satellite image, a target sky image that matches the current environmental parameter;

determine a direction parameter of the camera device when capturing a to-be-stitched image, wherein the to-be-stitched image is an image captured under the current environmental parameter; and stitch the target sky image with the to-be-stitched image according to the direction parameter to obtain a panoramic image, wherein:

the target sky image is obtained by one of: an imaging clipping, a selection from a material library, and an image-recognition process, wherein when the target sky image is obtained by the image clipping, the processor is further configured to:

determine, according to a sky range value of the to-be-stitched image, a clipping range of the meteorological satellite image;

obtain, based on a position parameter of the drone, a regional image from the meteorological satellite image according to the clipping range; and determine, according to the regional image obtained through the image clipping, the target sky image.

* * * * *